Nov. 16, 1971   J. F. CLEARMAN ET AL   3,620,040
COMBINATION ICE AUGER AND ICE PRESS
Filed Oct. 17, 1969   3 Sheets-Sheet 1

INVENTORS
JACK F. CLEARMAN
LEONARD W. OHLSSON
ROBERT H. SITKO
BY ATTORNEYS

Nov. 16, 1971  J. F. CLEARMAN ET AL  3,620,040
COMBINATION ICE AUGER AND ICE PRESS
Filed Oct. 17, 1969  3 Sheets-Sheet 2
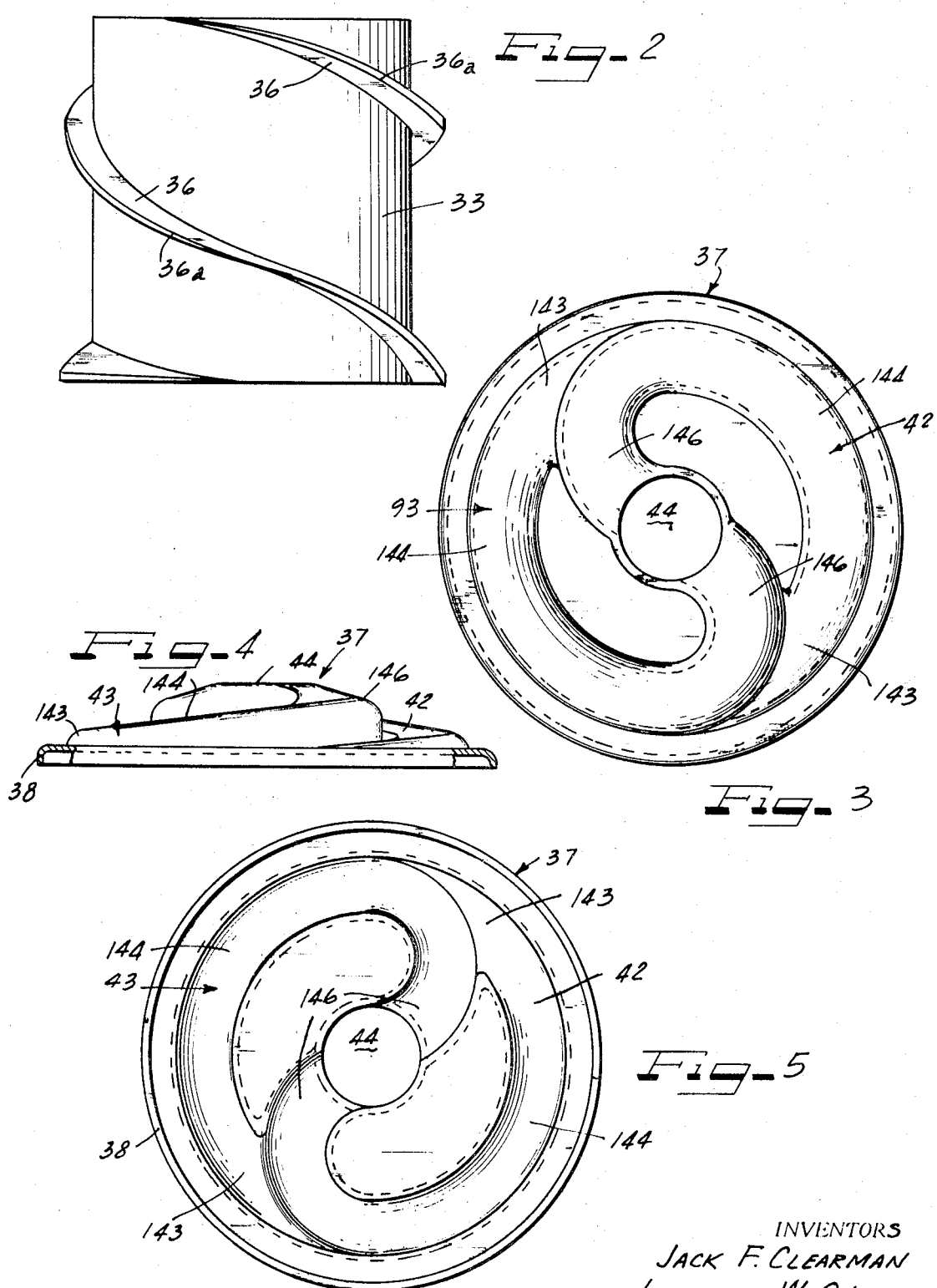
INVENTORS
JACK F. CLEARMAN
LEONARD W. OHLSSON
ROBERT H. SITKO
ATTORNEYS Nov. 16, 1971    J. F. CLEARMAN ET AL    3,620,040
COMBINATION ICE AUGER AND ICE PRESS
Filed Oct. 17, 1969    3 Sheets-Sheet 3
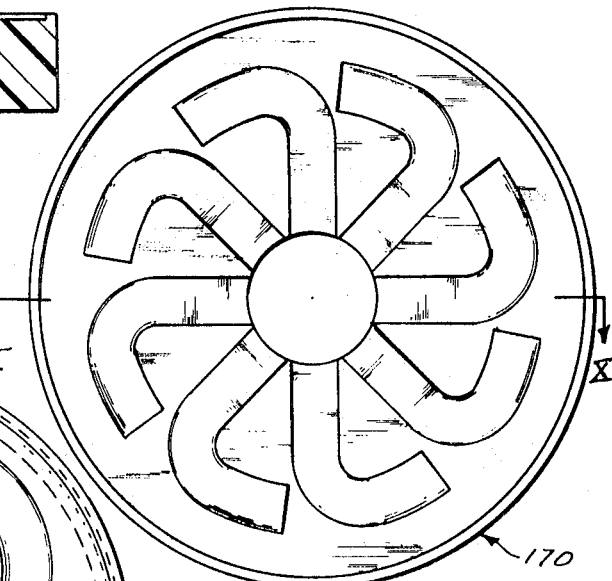
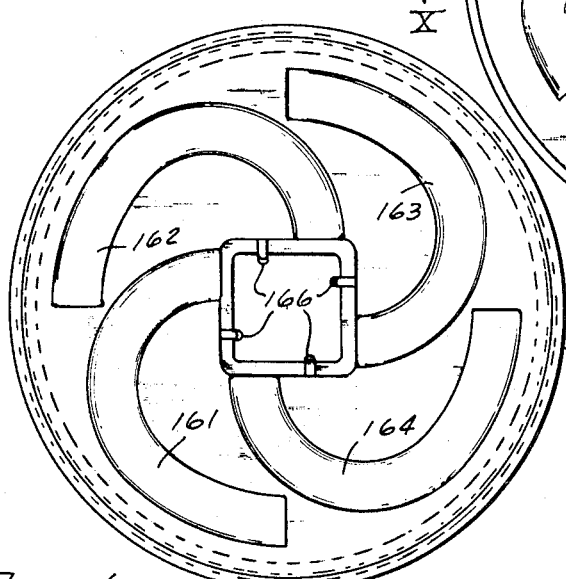
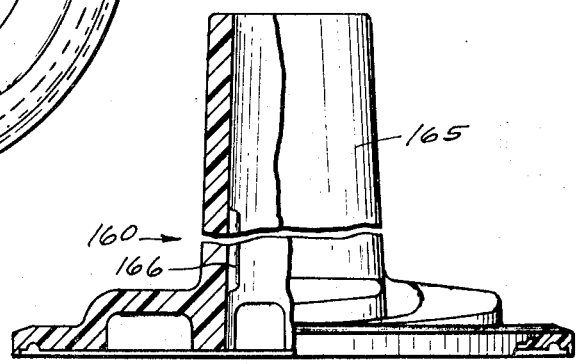
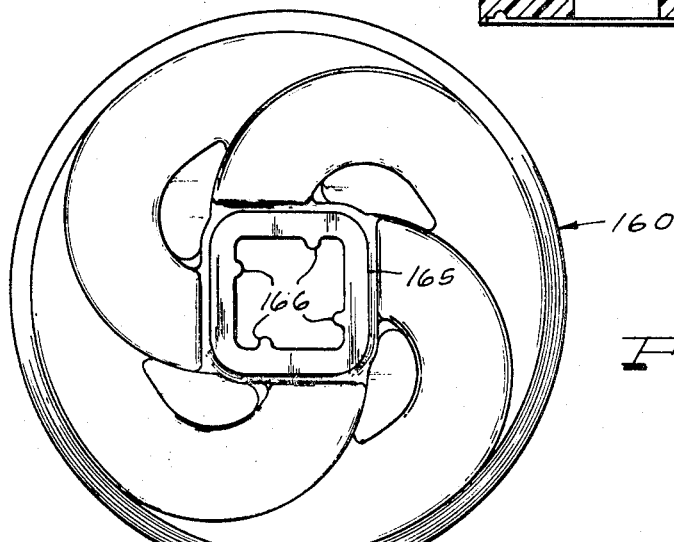
INVENTORS
JACK F. CLEARMAN
LEONARD W. OHLSSON
ROBERT H. SITKO
BY
ATTORNEYS ent Office 3,620,040
Patented Nov. 16, 1971

3,620,040
COMBINATION ICE AUGER AND ICE PRESS
Jack F. Clearman, Stevensville, Mich., and Leonard W. Ohlsson, St. Paul, and Robert H. Sitko, Stillwater, Minn., assignors to Whirlpool Corporation, Benton Harbor, Mich.
Filed Oct. 17, 1969, Ser. No. 867,223
Int. Cl. F25c 1/14
U.S. Cl. 62—354                                                              27 Claims

ABSTRACT OF THE DISCLOSURE

An ice maker machine employing a refrigerated chamber and a harvesting auger positioned with its flights in scraping relation to the inner wall of the refrigerated chamber to continuously scrape ice particles from the wall thereof, and being provided with a vertical shaft for supporting the harvesting auger. A collecting chamber receives the discharge from the harvesting auger and has a configuration characterized by one or more channels for directing flake ice product cirumferentially as well as radially inwardly into a disharge chamber. A compression auger in the form of a screw shaft co-rotatable with the harvesting auger drives the ice product in the form of a confined columnar path through a compression device prior to discharge of the ice product from the machine. The machine is further characterized by the provision of bearing means which engage the shaft below the freezing chamber and provide a cantilever type support for the auger and the screw shaft, thereby providing for unimpeded flow of flake ice product axially of the machine.

CROSS REFERENCE TO RELATED APPLICATIONS

This application discloses structural features which are also in part disclosed in the application of Jack F. Clearman, filed on Oct. 17, 1969, as U.S. Ser. No. 867,149; the application of James G. Darby and Jack F. Clearman, filed on Oct. 17, 1969, as U.S. Ser. No. 13,912; and the application of Jack F. Clearman, Leonard W. Ohlsson and Michael H. Mackin, filed on Oct. 17, 1969, as U.S. Ser. No. 867,222.

BACKGROUND OF THE INVENTION

Field of the invention

This invention relates generally to ice maker constructions.

DESCRIPTION OF THE PRIOR ART

The prior art has numerous examples of machines arranged to continuously produce flakes of ice and other frozen materials. Typical among such disclosures are those found in Vogt Pat. No. 2,013,016; Read Pat. No. 2,646,974; Ross Pat. No. 3,101,598; Ross Pat. No. 3,238,740; Dedricks et al. Pat. No. 3,256,710; Lunde Pat. No. 3,276,223; Nelson Pat. No. 3,283,529; and Raver et al. Pat. No. 3,371,505.

SUMMARY OF THE INVENTION

The present invention relates to an ice maker machine in which a flake ice product is produced by scraping the walls of a cylindrical freezing compartment with the scraping edges of helical flight on the harvesting auger. A wet mass of ice particles including slush and chunks is axially advanced out of the freezing chamber by the harvesting auger and the mixture is delivered to a collecting chamber where by virtue of the configuration of channel-like passageways formed in the walls of the chamber, the flake ice product is moved in a generally spiral path inwardly of the collecting chamber to be discharged at a central aperture thereof into a discharge chamber.

A screw shaft or compression auger extends through the discharge opening and advances the flake ice product in a columnar form through a compression device and thence directs the flake ice product to a proint of utilization.

The ice maker machine of the present invention is characterized by the provision of an unimpeded flow of the ice from the time of the harvesting of the ice particles to the time when the desired ice product is discharged from the machine. To accomplish this, the harvesting auger and the screw shaft in a preferred embodiment are coaxially mounted for common rotation on a shaft which is supported in cantilever fashion through a pair of spaced roller bearings, one of which is located in close proximity to the base of the shaft. Thus, a relatively large diameter harvesting auger may be provided in association with the axial discharge at the top of the machine.

BRIEF DESCRIPTION OF THE DRAWINGS

FIG. 2 is a view in elevation of the harvesting auger used in the showing of FIG. 1;

FIG. 3 is a top plan view of the collecting chamber shown in the machine of FIG. 1;

FIG. 4 is a view in elevation of the collecting chamber;

FIG. 5 is a bottom plan view of the same collecting chamber;

FIG. 6 is a bottom plan view of another form of collector chamber;

FIG. 7 is a sectional elevational view of the collector of FIG. 6;

FIG. 8 is a top plan view of the collector chamber of FIG. 6;

FIG. 9 is a bottom plan view of still another form of collector chamber; and

FIG. 10 is a sectional elevational view taken along the line 10—10 of FIG. 9.

DESCRIPTION OF THE PREFERRED EMBODIMENTS

Figure 1:
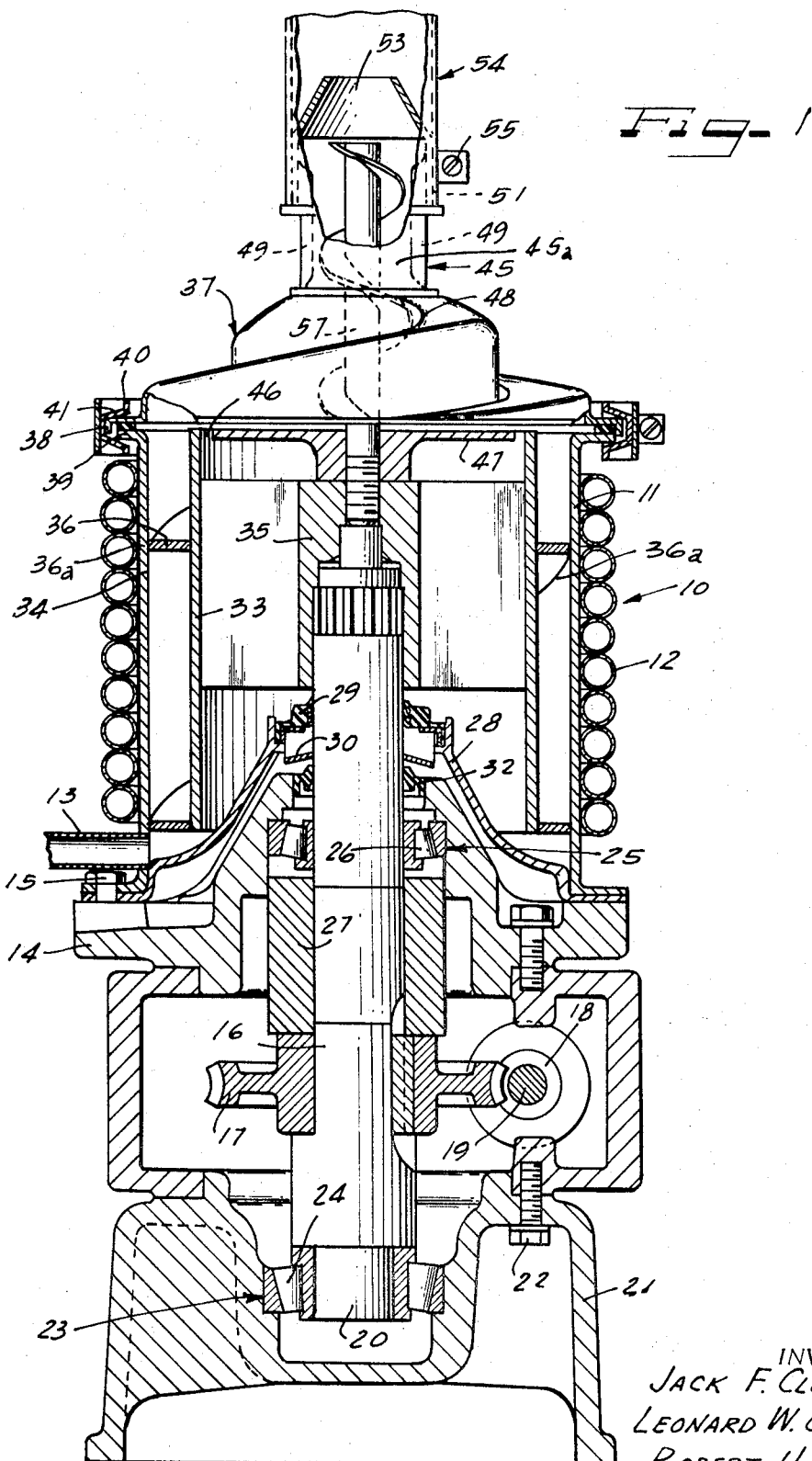
FIG. 1 is a cross-sectional view of an ice maker machine construction utilizing the improvements of the present invention.

The improved ice maker machine of the present invention is shown generally in FIG. 1 at reference numeral 10 and includes generally upright cylindrical freezing cylinder 11 about where there is trained coils 12 of an evaporator forming part of a complete refrigeration system.

Water is introduced into the cylinder 11 through an inlet conduit 13 near the base of the cylinder 11, the latter being mounted on a drive housing 14 by suitable fastening means such as bolts 15. Within the drive housing 14 there is a centrally disposed shaft 16 to which there is splined a gear 17 which meshes with a worm 18 mounted on a shaft 19, the latter being driven by a suitable motor (not shown).

The lower end of the shaft 16 has a reduced neck portion 20 disposed within a bearing housing 21, the latter being secured to the drive housing 14 by means of suitable fastening means such as bolts 22. Surrounding the necked down portion 20 of the shaft 16 is a combined roller and thrust bearing assembly 23, the latter including outwardly inclined roller bearings 24. Aditional bearing support for the shaft 16 is provided by a second roller bearing assembly 25 comprising a plurality of inwardly inclined roller bearing elements 26. Additional lateral support for the shaft 16 may be provided by the inclusion of a bearing sleeve 27 between the gear 17 and the roller bearing assembly 25.

Above the bearing assembly there is located a shroud 28 at the inner periphery of which there is disposed a flexible seal 29 engaging the periphery of the shaft 16. Any water which may get by the seal 29 is guided away from the bearing area by a water slinger or angularly inclined baffle 30 secured to shaft 16 in co-rotatable relation therewith. Additional protection to the bearing elements is provided by the provision of a flexible sealing lip 32 engaging the periphery of the shaft 16 to further prevent water from traveling down the shaft into the bearing area.

The cylinder 11 has an inner wall 33 spaced from its refrigerated wall 34 and has a hub 35 which is secured in threaded engagement by suitable means with the end of the shaft 16. The inner wall 33 carries two flights of helically disposed blades 36 which are sufficiently closely spaced to the inner periphery of the wall 34 so that the flights 36 have scraping edges 36a which scrape against the wall and thereby harvest the thin film of ice which forms on the surface whenever water is circulated in the freezing chamber. The rotation of the flights 36 will progressively advance a mixture of ice particles, slush and chunks upwardly to the top of the cylinder 11 and into a collecting chamber provided in accordance with this invention and which is generally indicated at 37.

As best seen in FIGS. 3 to 5, inclusive, the collecting chamber 37 has a depending annular flange 38 which is spaced from an annular flange 39 on the cylinder 11 by means of a seal ring 40. A compression bracket 41 is provided about the combination of the two flanges 38 and 39 and the sealing ring 40 to provide a liquid-tight seal.

The collecting chamber 37, in the form shown in FIGS. 3, 4 and 5, comprises a generally circular or cup-shaped cap member provided with a pair of channels 42 and 43 which define generally spiral paths of increasing cross-section for the flake ice product discharged from the freezing chamber by the flights 36.

The specific configuration of each respective channel 42 and 43 is identical and the two channels 42 and 43 illustrated are symmetrically disposed with respect to one another, hence, only one channel need be described in detail and the same reference numerals may be applied to corresponding parts.

Referring further to FIGS. 3, 4 and 5, it will be noted that the channel 43 begins at the outer periphery of the cap member and has a portion 143 which is relatively shallow. Each channel 42 and 43 is generally trough-shaped in cross-section and includes vertically disposed side walls joined by a bight portion.

Each bight portion of each respective channel is disposed at an angle which has an axial extent so that the respective channels 42 and 43 become progressively larger in relative cross-section as shown in an intermediate portion 144. At such intermediate portion, the side walls of each respective channel extend circumferentially and in generally concentric relation to the center axis of the cap member.

Each intermediate portion 144 terminates in a radially inwardly extending curved portion 146. At the curved portion 146, the side walls extend along paths which may be described as corresponding generally to the involute of a circle, and the corresponding bight portion continues in axial angular inclination so that the cross-section of the corresponding trough continues to increase.

Each radially inwardly extending portion 146 intersects a centrally disposed axial discharge opening 44 having a diametral dimension at least as large as the spacing dimension between the side walls of each respective channel 42 and 43.

It will be apparent from the drawings, that the shallow end 143 and the intermediate portion 144 of each respective channel 42 and 43 is disposed in superjacent register with the annular space of the freezer chamber through which the flights 36 move. Thus, as the mixture of flake ice product is discharged out of the freezing chamber, it is given a component of motion by the angularly inclined bight portions and by the curved portions 146 tending to direct the flake ice products circumferentially and then radially inwardly into the outlet or discharge opening 44.

In passing through the collecting chamber 37, therefore, the flake ice product is given a generally spiral, upwardly ascending motion through channels of constantly increasing cross-sectional area.

As shown in FIG. 1, a compression auger comprising a screw shaft 48 having a diameter considerably less than the diameter of the harvesting auger 33 containing the flights 36 is provided. The compression auger or screw shaft 48 has helically disposed blades on a shaft 57 sized to extend through the outlet or discharge opening 44. Immediately subjacent the collecting chamber 37 and connected in co-rotatable assembly with the shaft 57 is a disk baffle 47. It will be noted that an annular space 46 may be provided between the outer edge of the disk baffle 47 and the walls of the auger 33, thereby permitting water to drain downwardly for recirculation through the freezer compartment.

The screw shaft 48 extends upwardly through a conduit 45 forming a discharge passage 45a and characterized by the formation on the inner wall thereof of a plurality of axially extending ribs 49 spaced circumferentially with respect to one another to prevent rotation of the ice in the discharge passage 45a. The blades on the compression auger 48 move closely adjacent the inner edges of the ribs 49. Thus, the flake ice product is advanced in columnar form and passes through the discharge passage 45a. Water removing means are provided, illustrated in FIG. 1 in the form of a compression device comprising a flexible tubular member 50 composed of a resilient material such as rubber, synthetic rubber or resin. The tubular member 50 has a cylindrical body portion 51 and a frusto-conical portion 52 defining a reduced diameter opening 53. The tubular member 50 is disposed within a cylinder 54 and is clamped thereto by means of a suitable clamping means 55. The cylinder 54 may be the lower end of a conduit communicating with means forming a storage space or receiving space for the ice product.

As the compression auger 48 delivers the wet ice particles to the tubular member 50, the cross-sectional areas of the columns of advancing ice are subject to compression by virtue of inwardly-directed resilient forces due to the resilience of the frusto-conical portion 52. Excess liquid is thereby squeezed from the product and is then capable of draining back into the collection chamber 37 and ultimately to the inlet conduit 13.

In another form of compression device (not shown), the tubular member corresponding to tubular member 50 is composed of a material such as metal, for example, steel; and the tubular member has a cylindrical body portion and a frusto-conical portion defining a reduced diameter opening corresponding to opening 53, and a straight exit section of approximately the same cross-sectional area as the reduced diameter opening. The straight section may have one or more axial slits in its wall so that the exit section may more readily yield under compressive forces developed during ice making. In this latter form of compression device, the excess water is squeezed from the ice product as it is driven through the reduced diameter opening corresponding to opening 53.

Referring now to FIGS. 6, 7 and 8, another form of collecting chamber 160 is shown therein having four spiral passageways 161, 162, 163 and 164 extending from the outer periphery of the collecting chamber and terminating on the central axis of the collecting chamber. The chamber 160 has a substantially square cross-section outlet portion 165 for compression of the ice product. The walls of the outlet portion 165 are provided with a series of axial ridges 166 to prevent the ice product rotating during the ice making process.

Still another form of collecting chamber 170 is shown in FIGS. 9 and 10 wherein the collecting chamber 170 is provided with a series of eight spiral passageways each leading from substantially the outer periphery of the collecting chamber to a central opening to which is attached a compression device which may be similar to that shown in FIG. 1.

The operation of the ice maker in transferring the ice from the space defined by the cylinder 11 through the collecting chambers through the compression device via a compression auger, to a conduit for delivery of ice to a storage space or to a receiver, is substantially as described in connection with the version shown in FIGS. 1-5 described above.

From the foregoing, it will be seen that the ice maker machine of the present invention provides an axial flow arrangement for forming and continuously discharging discrete ice particles.

The configuration of the harvesting auger and its supporting bearings is such that the upper end of the shaft carrying the harvesting auger and the compression auger assemblies is without bearing support. The harvesting auger can be made relatively short, but with a relatively large diameter so that the unsupported end of the shaft does not flex under load conditions. Therefore, a main feature of the invention is the drive and bearing arrangement for the harvesting auger so that only one bearing support is required in contrast to prior art constructions which require a bearing support at the upper end of the auger.

Although minor modifications might be suggested by those versed in the art, it should be understood that we wish to embody within the scope of the patent warranted hereon all such modifications as reasonably and properly come within the scope of our contribution to the art.

The embodiments of the invention in which an exclusive property or privilege is claimed are defined as follows:

1. An ice maker machine comprising:
 a refrigerated chamber having a refrigerated inner wall,
 a helical harvesting auger positioned with its flights in close proximity to said refrigerated inner wall,
 inlet means for introducing water along said refrigerated wall,
 a generally vertical shaft supporting said harvesting auger for rotation,
 a collecting chamber receiving the discharge from said harvesting auger,
 bearing means engaging said shaft below said collecting chamber and providing bearing support for said shaft,
 means in said collecting chamber providing an inwardly directed generally spiral path for the wet ice particles received therein,
 said collecting chamber having a central aperture therein into which said particles are fed,
 a discharge chamber receiving the discharge through said aperture, and
 a compression auger in said discharge chamber arranged to discharge ice particles from said machine.

2. The machine of claim 1 in which said bearing means constitute the sole bearing support for said shaft.

3. The machine of claim 1 in which said means in said collecting chamber provide a generally spiral path of increasing cross-section for the ice particles.

4. The machine of claim 1 in which said compression auger has a substantially smaller diameter than said harvesting auger.

5. The machine of claim 1 in which said bearing means consists of a pair of spaced roller bearings, one of which is disposed adjacent the lower end of said shaft.

6. The machine of claim 1 in which said harvesting auger has drain means thereon for draining water from said collecting chamber back to said inlet means.

7. The machine of claim 1 in which said collecting chamber has integral channels therein providing said generally spiral path from the periphery of said collecting chamber to the central aperture thereof.

8. For use in an ice flaker, the improvement of a cap member for receiving ice flake product from a freezer chamber:
 said cap member comprising a generally circular cup-shaped member having a centrally disposed outlet opening,
 two symmetrically disposed channels formed in said cap member comprising side walls and a bight portion,
 each of said channels having a shallow portion, an intermediate portion, and a curved portion,
 said side walls extending concentrically and circumferentially
 at said shallow portion and at said intermediate portion and said side walls extending through a path corresponding generally to the involute of a circle at said curved portion to intersect said opening at said curved portion,
 said bight portion extending angularly in axial direction so that the cross-sectional area of each of said channels increases,
 whereby the ice flake product is directed circumferentially and inwardly into the outlet opening.

9. In an ice maker of the type having means forming a freezing chamber and an auger rotatable in said chamber for advancing an ice flake product harvested from the walls thereof axially, the improvement of:
 a cap member for the freezing chamber receiving the ice flake product therefrom and comprising:
 means forming an outlet aperture centrally of said cap member;
 means forming a plurality of channels with each of said channels having a constantly increasing cross sectional area and being shaped to direct the ice flake product spirally and inwardly from a periphery of the freezing chamber to said central outlet.

10. In an ice maker, a cap member as defined in claim 9 and further characterized by:
 each of said channels comprising sidewalls and a bight portion with said bight portion extending angularly in an axial direction so that the cross-section of each of said channels increases.

11. In an ice maker, a cap member as defined in claim 9 and further characterized by:
 said means forming a plurality of channels comprising a pair of symmetrically disposed channels.

12. In an ice maker, a cap member as defined in claim 9 and further comprising:
 means forming a discharge passage extending axially outwardly of said outlet aperture and being noncircular in transverse cross section.

13. In an ice maker, a cap member as defined in claim 12 and further characterized by:
 said discharge passage having a substantially square cross-section.

14. In an ice maker, a cap member as defined in claim 13 and further characterized by:
 said means forming a plurality of channels comprising four substantially identical channels with each said channel extending from a periphery of the freezing chamber to the respective ones of the sides of said square discharge passage.

15. In an ice maker, a cap member as defined in claim 12 and further characterized by:
 means in said discharge passage and engaging the ice flake product passing therethrough to prevent rotation of the product within said passage.

16. In an ice maker, a cap member as defined in claim 12 and further characterized by:
 means forming a plurality of ridges in said discharge passage extending parallel to an axis thereof for engaging the ice flake product flowing through said discharge passage to prevent rotation of the ice product therein.

17. An ice maker comprising:
 multiple chamber means including means forming a lower freezing chamber having a refrigerated cylindrical wall,
 an upper discharge chamber having walls converging axially to form a compression zone with a top outlet, and an intermediate collecting chamber therebetween,
    said collecting chamber comprising channel means shaped to direct ice product harvested in said freezing chamber radially inwardly into said discharge chamber,
a rotatable shaft disposed on a vertical axis,
bearing means below said refrigerated cylindrical wall providing cantilever support for said shaft,
auger means on said shaft including:
    a harvesting auger having flights positioned in operative proximity to said refrigerated cylindrical wall to harvest ice product therefrom,
    and ice compression screw blade means,
        said auger means extending upwardly from said bearing means into said freezing chamber and said screw blade means extending through said collecting chamber and into said discharge chamber,
whereby said cantilever-supported shaft and each of said chambers and said auger means are disposed on a common vertical axis so that ice harvested by said flights is compressed by said screw blade means in said discharge chamber and is discharged as a compacted dehydrated ice column from the top outlet.

18. An ice maker as defined in claim 17 and further characterized by:
    means forming a shroud closing a lower end of said freezer chamber; and
    said means at an inner periphery of said shroud and engaging an outer periphery of said rotatable shaft to prevent egress of water from said freezer chamber between said shroud and said rotatable shaft.

19. An ice maker as defined in claim 18 and further characterized by:
    baffle means secured to said rotatable shaft below said seal means and for corotation with said shaft to guide any water which may leak through said seal means away from said spaced bearing means.

20. An ice maker as defined in claim 17 and further characterized by:
    said freezer chamber having an internal, cylindrical ice forming surface; and
    said harvesting auger comprising
        a hub portion corotatably supported on said rotatable shaft;
        a cylindrical wall portion spaced radially inwardly of said cylindrical ice forming surface and outwardly of said shaft and being substantially coextensive therewith in axial directions; and
    said flights comprising means forming at least one flight of helically disposed blades attached to an outer periphery of said cylindrical wall portion and having edges disposed in confronting relationship to said cylindrical ice forming surface for harvesting a thin film of ice which forms on said surface whenever water is circulated in said freezer chamber.

21. An ice maker as defined in claim 20 and further characterized by:
    wall means extending radially of said rotatable shaft and connected thereto for corotation therewith and forming a baffle separating said harvesting auger from said compression auger; and
    means forming drain passageways near an outer periphery of said wall means, thereby permitting water removed by said compression auger to drain downwardly for recirculation through said freezer chamber.

22. An ice maker as defined in claim 17 and further characterized by:
    means forming a gear reduction box housing,
    gear reduction means in said housing,
    said shaft driven by said gear reduction means and projecting vertically upwardly out of said gear reduction box,
    said bearing means being spaced on opposite sides of said gear reduction means.

23. An ice maker as defined in claim 17 wherein said channel means more particularly comprises:
    a plurality of spiral passageways extending from the outer periphery of said freezing chamber and terminating on the central axis of said collecting chamber,
    said collecting chamber having a substantially square cross sectional configuration.

24. An ice maker as defined in claim 23 and further characterized by said walls of said collecting chamber having a series of axial ridges to prevent rotation of the ice product.

25. An ice maker as defined in claim 17 wherein said channel means more particularly comprises a series of generally spiral passageways leading from substantially the outer periphery of said freezing chamber to a central opening.

26. An ice maker as defined in claim 17 wherein said channel means more particularly comprises at least two channels each having a shallow portion, an intermediate portion and a curved portion,
    the side walls of each of said two channels extending concentrically and circumferentially at said shallow portion and at said intermediate portion
    and said side walls extending through a path corresponding generally to the involute of a circle at said curved portion to intersect a centrally disposed opening through which said screw blades extend at said curved portion.

27. In combination,
a cylindrical freezing chamber,
an auger rotatable in said freezer chamber and advancing ice flake product out of one end thereof, and
a cap member on said one end of said freezer chamber having a centrally disposed outlet opening and two symmetrically disposed channels formed therein,
    each of said channels comprising side walls and a bight portion,
        each of said channels having a shallow portion, an intermediate portion and a curved portion,
said side walls extending concentrically and circumferentially at said shallow portion and at said intermediate portion and said side walls extending through a path corresponding generally to the involute of a circle to intersect said outlet opening at said curved portion,
said bight portion extending angularly in axial direction so that the cross-section of each of said channels increases,
whereby the ice flake product is directed circumferentially and inwardly,
and a compression auger connected in co-rotatable driven relation with said auger and extending through said outlet opening of said cap member to drive the ice flake product in columnar form to a point of utilization.

References Cited

UNITED STATES PATENTS

| | | | |
|---|---|---|---|
| 3,319,438 | 5/1967 | Kuebler et al. | 62—320 X |
| 3,342,040 | 9/1967 | Dedricks et al. | 62—354 X |

FOREIGN PATENTS

| | | | |
|---|---|---|---|
| 409,499 | 5/1934 | Great Britain | 62—354 |

WILLIAM E. WAYNER, Primary Examiner

UNITED STATES PATENT OFFICE
CERTIFICATE OF CORRECTION

Patent No. 3,620,040　　　　　　　　　　Dated November 16, 1971

Inventor(s) Jack F. Clearman et al.

It is certified that error appears in the above-identified patent and that said Letters Patent are hereby corrected as shown below:

Claim 18: Column 7, line 30, cancel "said", first occurrence, and substitute therefor -- seal --.

Signed and sealed this 9th day of May 1972.

(SEAL)
Attest:

EDWARD M. FLETCHER, JR.　　　　　　　　ROBERT GOTTSCHALK
Attesting Officer　　　　　　　　　　　Commissioner of Patents